US012716005B2

(12) United States Patent
Oh et al.

(10) Patent No.: US 12,716,005 B2
(45) Date of Patent: Aug. 25, 2026

(54) INK COMPOSITION FOR 3D PRINTING BASED ON UREA REACTION AND THE 3D PRINTING METHOD USING THE SAME

(71) Applicant: 3DMATERIALS CO., LTD., Anyang-si (KR)

(72) Inventors: Jung Hyun Oh, Daejeon (KR); Eun Jeong Hahm, Seoul (KR); Jin A Kim, Daejeon (KR)

(73) Assignee: 3DMATERIALS CO., LTD., Anyang-si (KR)

( * ) Notice: Subject to any disclaimer, the term of this patent is extended or adjusted under 35 U.S.C. 154(b) by 377 days.

(21) Appl. No.: 18/549,143

(22) PCT Filed: Dec. 8, 2021

(86) PCT No.: PCT/KR2021/018549

§ 371 (c)(1),
(2) Date: Sep. 5, 2023

(87) PCT Pub. No.: WO2022/191382

PCT Pub. Date: Sep. 15, 2022

(65) Prior Publication Data

US 2024/0166905 A1 May 23, 2024

(30) Foreign Application Priority Data

Mar. 9, 2021 (KR) ........................ 10-2021-0030640

(51) Int. Cl.
*C09D 11/38* (2014.01)
*B29C 64/112* (2017.01)
(Continued)

(52) U.S. Cl.
CPC ............ *C09D 11/38* (2013.01); *B29C 64/112* (2017.08); *B29C 64/124* (2017.08);
(Continued)

(58) Field of Classification Search
CPC ..... C09D 11/38; C09D 11/322; C09D 11/102; C09D 11/34; C09D 11/104; B29C 64/124;
(Continued)

(56) References Cited

U.S. PATENT DOCUMENTS 4,761,465 A * 8/1988 Speranza ........... C08G 18/8061 528/68
2009/0038506 A1* 2/2009 Odell .................... C09D 11/34 106/31.13
2016/0046079 A1* 2/2016 Belelie .................... B29C 64/40 264/496

FOREIGN PATENT DOCUMENTS

EP 0 301 718 A2 2/1989
JP 2017094721 A * 6/2017 ........... B29C 64/106
(Continued)

OTHER PUBLICATIONS

International Search Report and Written Opinion mailed Mar. 10, 2022, issued in International Patent Application No. PCT/KR2021/018549, filed Dec. 8, 2021, 17 pages.

*Primary Examiner* — Yaovi M Ameh
(74) *Attorney, Agent, or Firm* — Christensen O'Connor Johnson Kindness PLLC

(57) ABSTRACT

The present invention provides an ink composition for 3D printing based on a urea reaction that is applied as a liquid on a build platform, undergoes a phase change to a gelled solid in an applied state, and forms a 3D structure by being cured by cross-linking through the urea reaction with a curing agent ink sprayed onto a surface, and a 3D printing method using the same.

19 Claims, 2 Drawing Sheets

(51) Int. Cl.

| | |
|---|---|
| ***B29C 64/124*** | (2017.01) |
| ***B29C 64/188*** | (2017.01) |
| ***B29C 64/209*** | (2017.01) |
| ***B29C 64/245*** | (2017.01) |
| ***B33Y 10/00*** | (2015.01) |
| ***B33Y 30/00*** | (2015.01) |
| ***B33Y 70/00*** | (2020.01) |
| ***C08G 18/10*** | (2006.01) |
| ***C09D 11/102*** | (2014.01) |
| ***C09D 11/322*** | (2014.01) |
| *B29K 75/00* | (2006.01) |
| *B33Y 70/10* | (2020.01) |
| *C08G 18/32* | (2006.01) |
| *C08K 3/013* | (2018.01) |
| *C09D 11/104* | (2014.01) |
| *C09D 11/34* | (2014.01) |

(52) U.S. Cl.

CPC .......... *B29C 64/188* (2017.08); *B29C 64/209* (2017.08); *B29C 64/245* (2017.08); *B33Y 10/00* (2014.12); *B33Y 30/00* (2014.12); *B33Y 70/00* (2014.12); *C08G 18/10* (2013.01); *C09D 11/102* (2013.01); *C09D 11/322* (2013.01); *B29K 2075/02* (2013.01); *B33Y 70/10* (2020.01); *C08G 18/32* (2013.01); *C08G 18/3228* (2013.01); *C08K 3/013* (2018.01); *C09D 11/104* (2013.01); *C09D 11/34* (2013.01)

(58) Field of Classification Search

CPC ... B29C 64/188; B29C 64/209; B29C 64/245; B29C 64/112; B33Y 10/00; B33Y 70/00; B33Y 30/00; B33Y 70/10; B29K 2075/02; C08G 18/10; C08G 18/32; C08G 18/3228; C08K 3/013

See application file for complete search history.

(56) References Cited

FOREIGN PATENT DOCUMENTS

| | | | |
|---|---|---|---|
| KR | 10-1995940 | B1 | 6/2014 |
| KR | 10-2017-0023977 | A | 3/2017 |
| KR | 20190090846 | A | 8/2019 |
| KR | 10-2020-0128598 | A | 11/2020 |

* cited by examiner

[FIG. 1]
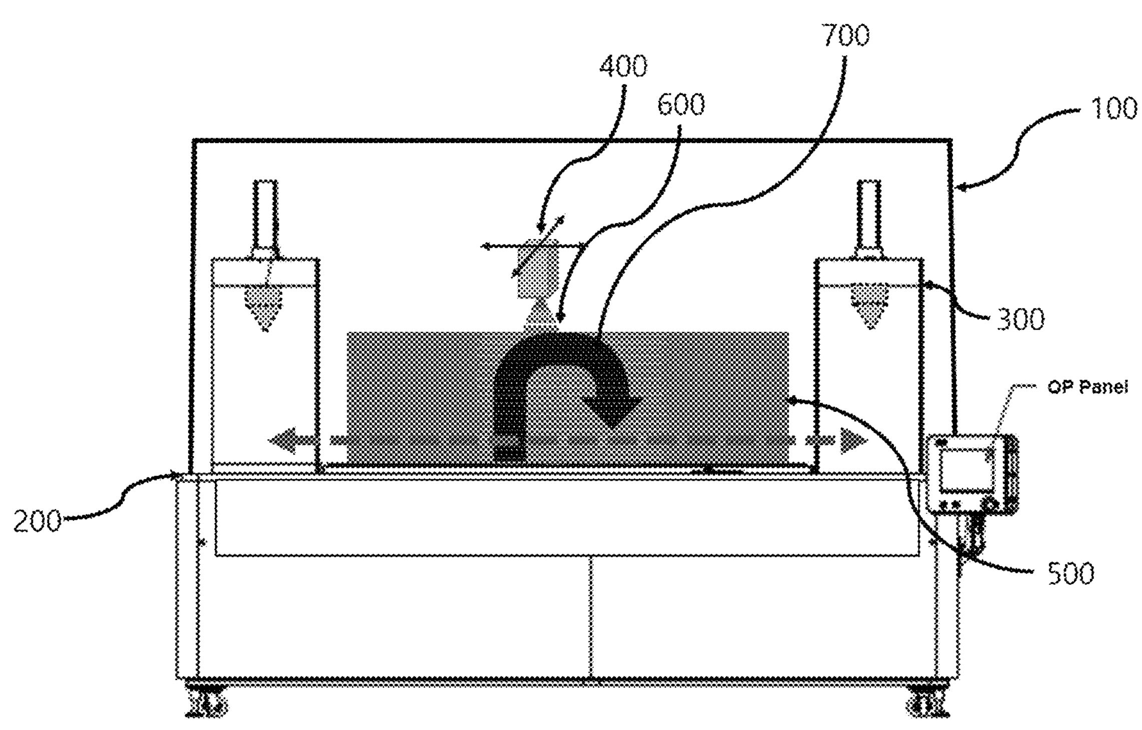
[FIG. 2]
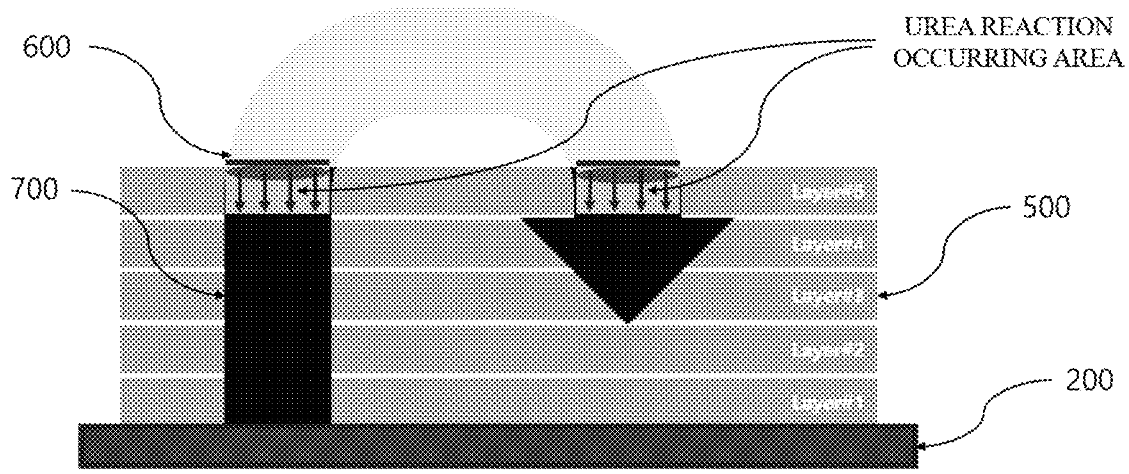

[FIG. 3]
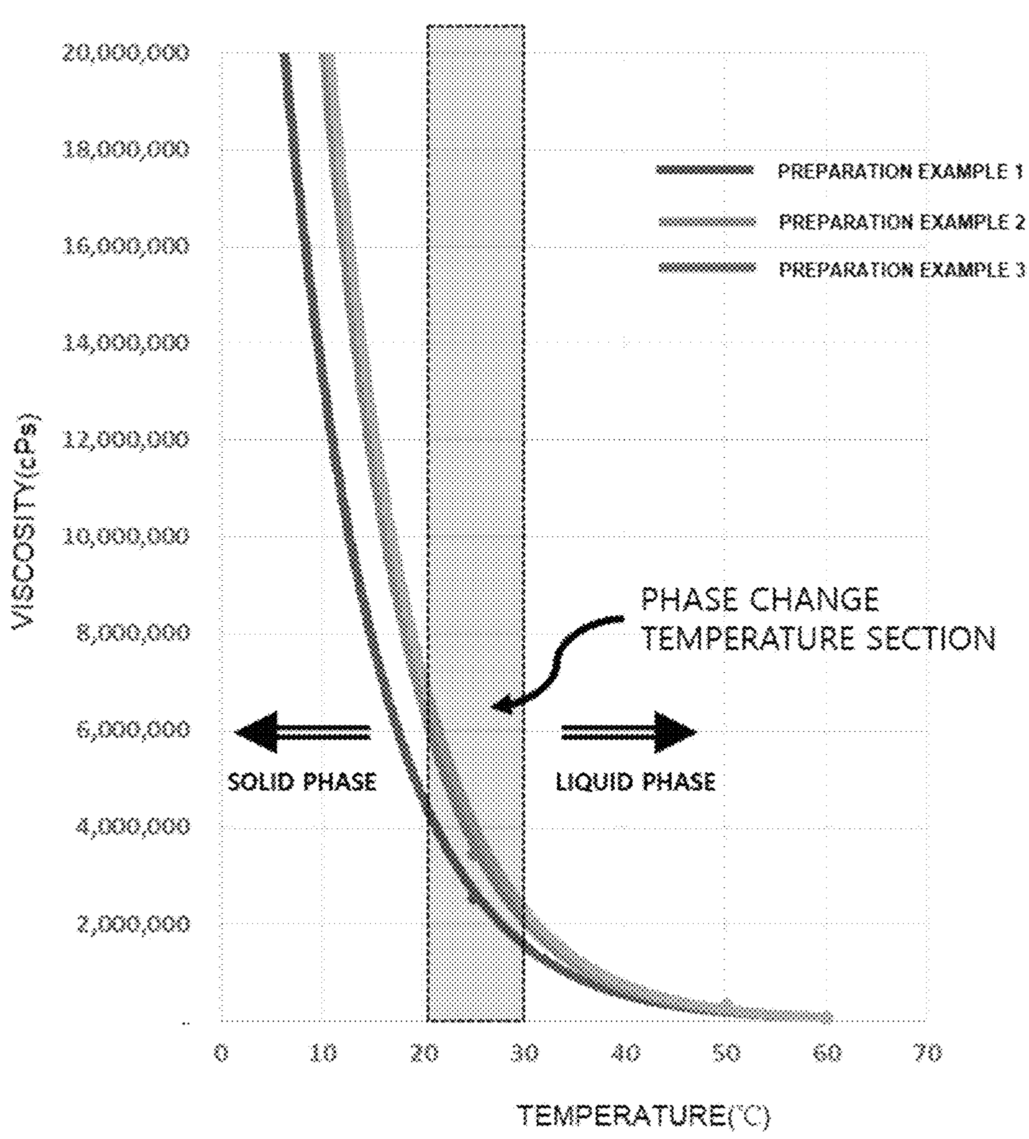

INK COMPOSITION FOR 3D PRINTING BASED ON UREA REACTION AND THE 3D PRINTING METHOD USING THE SAME

TECHNICAL FIELD

The present invention relates to an ink composition for 3D printing based on a urea reaction and a 3D printing method using the same, and more particularly, to an ink composition for 3D printing based on a urea reaction that is applied as a liquid on a build platform, undergoes a phase change to a gelled solid in an applied state, and forms a 3D structure by being cured by cross-linking through the urea reaction with a curing agent ink sprayed onto a surface, and a 3D printing method using the same.

BACKGROUND ART

Recently, the 3D printing industry itself is rapidly establishing as a new industry, and is actively expanding the scope of application in each industry. The 3D printing, also called additive manufacturing (AM), refers to a process of manufacturing three-dimensional objects by stacking materials using digital design data. The conventional manufacturing technology for three-dimensional objects was mainly a subtractive manufacturing type that produces three-dimensional objects by cutting or shaving three-dimensional materials through mechanical processing, but the 3D printing takes a method of producing three-dimensional objects by stacking printing materials step by step.

As such a 3D printing method, a stereolithography (SLA) method disclosed in Korean Patent Laid-Open Publication No. 10-2018-0125910, a laser sintering (SLS) method disclosed in Korean Patent Laid-Open Publication No. 10-2018-0076951, or the like is used. In addition, various methods such as a molten deposition modeling (FDM) method or a multi-jet modeling (MJM) method are applied and used.

Among these, the SLA-type 3D printing technology capable of providing relatively high printing precision and fast printing speed has recently been actively developed. Despite the above-described advantages, the SLA method has a problem that many limitations follow when printing large-sized printed matters That is, in the SLA-type 3D printing process, due to the nature of the photocuring printing method, the 3D structure is printed through a process of selectively curing an ink composition applied in units of layers through light irradiation by using a laser beam, digital light processing (DLP), a liquid crystal display (LCD), or the like. In this case, the SLA-type 3D printing process has a disadvantage that it is not suitable for printing the printing large-sized printed matters due to the structural limitations in the light irradiation process.

In other words, in the case of using the laser beam, due to the nature of the point source, there is a disadvantage in that, in printing the large-sized printed matters, a printing time required per layer becomes excessively long and the overall printing speed becomes very slow, and in the case of using the DLP or the LCD, since the precision of the printed matters is determined by a pixel size of the LCD panel or the DLP, there is a limit to precisely printing the large-area printed matters. In addition, in order to solve this problem, a method of connecting and using a plurality of LCD panels is sought, but in that case, the probability that the structural defects of the printed matter, such as cracks, occur at a connection part of the LCD panel increases, so there is a limitation that it is difficult to guarantee structural integrity of large-area printed matters.

In addition, the SLS or BUM-type 3D printing process also shows the same disadvantage that the overall printing speed becomes very slow since the printing time required for each layer is excessively long in printing the large-sized printed matters due to the limitation of the characteristics of the point source using a laser beam.

On the other hand, the inkjet-type 3D printing process, which is one of the MJM-type 3D printing processes, shows a direction to effectively solve the problem of size limitation of a printed matter through a method of driving an inkjet nozzle using 2-D actuators.

However, in this case, as the conventional inkjet-type 3D printing process includes spraying an ink composition for forming a 3D structure in a desired shape through a plurality of inkjet nozzles and performing printing by curing the sprayed ink composition through a photocuring or thermal curing process, when printing large structures, a process of spraying a large amount of ink composition through an inkjet nozzle is required. In this case, since an ejection speed of the ink composition sprayed through the inkjet nozzle is limited, in printing the large-sized printed matters, the conventional inkjet 3D printing process has the disadvantage in that the printing time takes a very long time.

In addition, in the case of the above-described conventional inkjet-type 3D printing process, in order to spray the ink composition through the nozzle, since the ink composition to be sprayed requires a low viscosity of several tens of cPs or less, it is difficult to use an oligomer or polymer composition having a high molecular weight, physical properties of a 3D structure to be manufactured are limited. In other to solve the above problem, when a large amount of solvent is mixed and used in the ink composition, the overall volume of the sprayed ink increases, causing an additional problem that much longer printing time is required.

Furthermore, in producing printed matters through such a 3D printing method, whatever method is applied, due to the nature of the printing process, when an overhang portion is present in shapes of three-dimensional objects to be printed, that is, printed matters, a supporter structure for supporting the overhang portion is required. To this end, in the conventional 3D printing process, the supporter for supporting the overhang portion generated during the formation of the printed matters is printed with the printed matter, and after the printing process is completed, the process of removing the supporters attached to the printed matters through the post-processing process is essential, which is a major factor of not only increasing and complicating the entire working process, but also consuming raw materials for supporter printing to increase the overall production costs.

DISCLOSURE

Technical Problem

The present invention is to solve the above-mentioned problems in the conventional 3D printing method, and the present invention provides an ink composition for 3D printing based on a urea reaction capable of effectively solving the problem of size limitation of a printed matter through a method of driving an inkjet nozzle using a 2-D actuator, realizing a fast printing speed by minimizing the amount of ink sprayed through the inkjet nozzle during printing of a 3D structure, and variously applying a high-viscosity polymer oligomer or polymer composition.

In addition, the present invention provides, an ink composition for 3D printing based on a urea reaction capable of simplifying the overall printing process and minimizing consumption of raw materials by omitting a supporter structure for supporting an overhang portion of a printed matter during 3D printing, and a 3D printing method using the same.

Technical Solution

In an aspect of the present invention, there are provided an ink composition for subject ink applied to a 3D printing method of printing a 3D structure by cross-linking through a urea reaction between a subject ink and a hardener ink includes a high-molecular oligomer or a high-molecular polymer containing at least one isocyanate group (—NCO) or amine group (—NH2) in its molecular structure, has phase change characteristics, which has a liquid-phase viscosity capable of coating in units of layers in an environment equal to or higher than a certain phase change temperature and undergoes a phase change to a gelled solid phase in a low-temperature environment equal to or lower than the phase change temperature, and a synthesis method thereof, and an inkjet-type 3D printing method based on an urea reaction for forming a 3D printed matter through cross-linking by the urea reaction with the hardener ink sprayed through an inkjet nozzle using the above-described ink composition as the subject ink.

Advantageous Effects

According to the present invention, by presenting a method of combining a subject ink and a hardener ink having an amine group (—NH2) and an isocyanate group (—NCO), respectively, and forming a 3D structure through cross-linking by a urea reaction between the subject ink and the hardener ink, it is possible to effectively solve the problem of size limitation of a printed matter through a method of driving an inkjet nozzle using a 2-D actuator and realize a fast printing speed by minimizing the amount of hardener ink ejected through the inkjet nozzle during the printing of the 3D structure.

In addition, by applying a subject ink of the present invention on a build platform through a coating method such as slot die coating or curtain coating, it is possible to variously apply and use a high-viscosity polymer oligomer or a polymer composition. Furthermore, through phase change characteristics of the subject ink applied on the build platform, during the production of a 3D printed matter, by omitting a supporter structure for supporting an overhang portion of a printed matter in the 3D printing process by performing the role of a supporter for supporting the 3D printed matter to be produced through an unreacted subject ink gelled and frozen on the build platform, it is possible to provide a more economical 3D printing method by simplifying the overall printing process and minimizing the consumption of raw materials.

BRIEF DESCRIPTION OF THE DRAWINGS

FIG. 1 is a diagram schematically illustrating an environment in which an inkjet-type 3D printing method based on a urea reaction is performed using an ink composition according to the present invention as a subject ink.

FIG. 2 is a diagram for explaining a process in which a 3D structure is printed through a urea reaction between a subject ink and a hardener ink made of an ink composition according to the present invention.

FIG. 3 is a graph illustrating, as an example, a change in viscosity according to a temperature of an ink composition used as a subject ink in the inkjet-type 3D printing method according to the present invention.

BEST MODE

Hereinafter, a preferred embodiment of a 3D printing ink composition based on a urea reaction according to the present invention and a 3D printing method using the same according to the present invention will be described in detail with reference to drawings.

MODE FOR INVENTION

As already briefly described above, the present invention employs a 3D printing method of combining a subject ink and a hardener ink each having an amine group (—$NH_2$) and an isocyanate group (—NCO) to form a 3D structure through cross-linking by a urea reaction between the subject ink and the hardener ink. As a result, the subject ink used in the 3D printing method is a high-molecular oligomer or a high-molecular polymer containing at least one isocyanate group (—NCO) or amine group (—$NH_2$) in its molecular structure, and correspondingly, cured by forming a cross-link through the urea reaction with a hardener ink made of a monomer or oligomer containing at least one amine group (—$NH_2$) or isocyanate group (—NCO), thereby forming a 3D structure.

FIG. 1 is a diagram schematically illustrating an environment in which an inkjet-type 3D printing method based on a urea reaction is performed using an ink composition according to the present invention as a subject ink.

As described above, the ink composition for 3D printing based on a urea reaction according to the present invention is an ink composition used as the subject ink in the 3D printing method in which the 3D structure is formed through cross-linking by the urea reaction between the subject ink and the hardener ink. In the present invention, as illustrated in FIG. 1, a subject ink 500 made of the ink composition according to the present invention is applied on a build platform 200 made of a slot die or the like in units of layers to a certain thickness by a slot coating unit 300 provided on the upper portion the build platform 200.

In this case, in the ink composition constituting the subject ink applied to the present invention, a high-molecular oligomer or high-molecular polymer, which has a liquid-phase viscosity so that a single layer for 3D printing may be deposited on the build platform 200 in an environment equal to or higher than a certain phase change temperature and has characteristics in which a phase is changed to a gelled solid phase due to a rapid increase in viscosity at a low temperature equal to or lower than the phase change temperature, is used. The phase change characteristics of the ink composition of the present invention will be described in detail with reference to FIG. 3 to be described later.

In order to effectively utilize the phase change characteristics of the subject ink, the 3D printing method according to the present invention is performed in the reaction chamber 100 in which the internal atmospheric temperature is always maintained at the above-described phase change temperature or lower of the subject ink. To this end, a temperature control means (not illustrated) for maintaining the internal atmosphere at a constant temperature or lower may be provided inside the reaction chamber 100.

In addition, it is more effective that a separate temperature control means is provided even on the build platform 200 on which the subject ink is applied in units of layers and sequentially stacked so that a surface temperature of the build platform 200 may always be maintained at the above-described phase change temperature or lower of the subject ink.

In this case, the slot coating unit 300 receives a liquid subject ink at room temperature through an ink supply line (not illustrated) or the like and applies the received liquid subject ink to a printed area on the build platform 200 in units of layers, and depending on the surface temperature of the build platform maintained at the phase change temperature or lower and the atmospheric environment inside the reaction chamber 100, the applied subject ink is frozen into a gelled solid immediately after applied to form a printed matter block, thereby serving to support a 3D printed matter 700 that is cured and produced by the urea reaction described later.

Subsequently, after the subject ink 500 is applied in units of layers to a certain thickness on the build platform 200, by spraying the hardener ink 600 according to the patterns set for each layer through the inkjet printer 400 provided on the upper portion of the build platform 200 to selectively cure the applied subject ink 500, the layer of the printed matter is formed. Here, as described above, the subject ink 500 made of the ink composition according to the present invention is a high-molecular oligomer or a high-molecular polymer containing at least one isocyanate group (—NCO) or an amine group (—$NH_2$) in its molecular structure, and to form the urea linkage by making the hardener ink 600 sprayed thereonto react with the applied subject ink, a monomer or oligomer containing at least one amine group ($NH_2$) or isocyanate group (—NCO) may be used.

Thereafter, when the 3D printing of one layer is completed through the above-described process, the 3D printed matter is produced by repeatedly performing the process of applying the subject ink 500 in units of layers to a certain thickness on the printed layer and spraying the hardener ink to the applied subject ink again. In this way, during the production of the 3D printed matter, which is performed while sequentially stacked in units of layers through the application of the subject ink and the spraying of the hardener ink, as described above, the subject ink gelled and frozen on the build platform while the hardener ink is not sprayed but applied is already in a state close to a solid with no fluidity at all, and thus, the subject ink itself serves as a supporter for supporting a 3D printed matter 700 that is cured by the urea reaction and forms a printed matter block.

FIG. 2 is a diagram for explaining a process in which a 3D structure is printed through a urea reaction between a subject ink and a hardener ink made of an ink composition according to the present invention.

As illustrated in the drawing, in the inkjet-type 3D printing method according to the present invention, by applying the subject ink 500 in units of layers on the build platform 200 and spraying the hardener ink 600 onto the subject ink 500 applied in this way according to the patterns set for each layer according to the shape of the 3D structure to be printed, a 3D printed matter 700 that is solidly hardened is printed through the urea linkage caused by the urea reaction between the sprayed hardener ink and the subject ink.

As shown in [Formula 1] below, the urea reaction refers to a chemical reaction in which the amine and isocyanate are mutually bonded through the urea linkage to form polyurea, and such a urea reaction is a reaction that proceeds actively at a very high speed without a special catalyst for reaction initiation or separate reaction initiation energy.

[Formula 1]

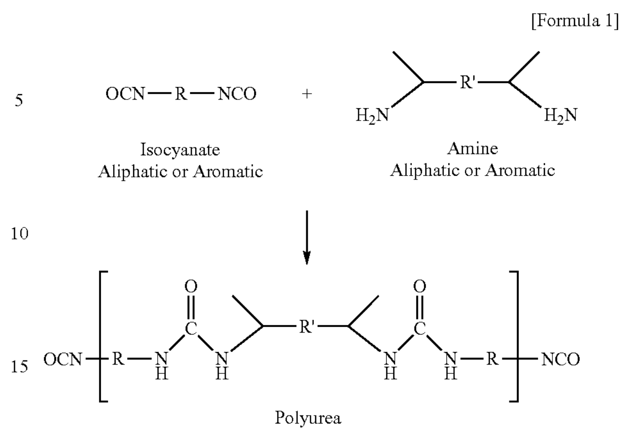

In this way, in order to form the hardened structure through the urea reaction occurring between the subject ink and the hardener ink, in the present invention, in selecting the ink composition for the subject ink, the high-molecular oligomer or the high-molecular polymer containing at least one isocyanate group (—NCO) or amine group (—$NH_2$) in its molecular structure is used, and contrary to the subject ink, as the hardener ink used together therewith, the monomer or oligomer containing an amine group (—$NH_2$) or an isocyanate group (—NCO) is used.

That is, in the present invention, as illustrated in FIG. 3, first, the subject ink 500 is applied in units of layers on the build platform 200, and the hardener ink 600 is sprayed onto the subject ink 500 applied in this way according to the patterns set for each layer according to the shape of the 3D structure to be printed. In this case, the subject ink 500 contains a reactive group of one of an isocyanate group (—NCO) or an amine group (—$NH_2$), and contrary to the subject ink, the hardener ink 600 sprayed thereonto contains an amine group (—$NH_2$) or an isocyanate group (—NCO), and thus, in the area where the hardener ink 600 is sprayed according to the patterns set for each layer, the urea reaction proceeds between the sprayed hardener ink and subject ink to implement the cross-linking, so the 3D printed matter 700 having the solidly cured polyurea structure is formed through the urea linkage.

In this case, the urea reaction occurring between the hardener ink and the subject ink is an exothermic reaction accompanied by reaction heat, and as illustrated in the drawing, the heat generated through the urea reaction on the surface of the applied subject ink melts an unreacted solidified subject ink at the bottom and changes the unreacted solidified subject ink into a liquid phase to diffuse the sprayed hardener ink to the bottom, so the reaction continues until all of the sprayed hardener ink reacts.

The ink composition for subject ink having an amine reactive group or an isocyanate reactive group, which is applied to the 3D printing process of the present invention performed according to the method described above, may be synthesized through various methods. Hereinafter, the composition and preparing method of the ink composition according to the present invention will be reviewed through several examples.

Example 1: Synthesis of Ink Composition Having Amine Reactive Group Through Urea Reaction When (m+1) mole of monomer or prepolymer having a chemical structure of $NH_2$—R1-$NH_2$ and having an amine group (—$NH_2$) at both ends and m moles of monomer or prepolymer having a chemical structure of NCO—R2-NCO and having an isocyanate group (—NCO) at both ends are linked by the urea reaction, As shown in [Formula 2] below, it is possible to synthesize an ink composition for subject ink having an amine reactive group at both ends. In this case, by adjusting the components and synthesis ratio of the monomer or prepolymer used in the synthesis, it is possible to synthesize a high-molecular oligomer or polymer having a molecular weight suitable for the phase change characteristics described above and the characteristics of the printed matter to be produced.

[Formula 2]

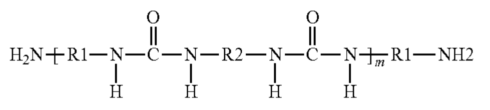

Here, R1 and R2 are hydrocarbon structures including polyol, ether, esters, or the like and m is a repeating number of 1 or more.

Example 2: Synthesis of Ink Composition Having Isocyanate Reactive Group Through Urea Reaction When m moles of monomer or prepolymer having a chemical structure of $NH_2$—R1-$NH_2$ and having an amine group (—$NH_2$) at both ends and (m+1) moles of monomer or prepolymer having a chemical structure of NCO—R2-NCO and having an isocyanate group (—NCO) at both ends are linked by the urea reaction, As shown in [Formula 3] below, it is possible to synthesize an ink composition for subject ink having an isocyanate reactive group at both ends. In this case, by adjusting the components and synthesis ratio of the monomer or prepolymer used in the synthesis, it is possible to synthesize a high-molecular oligomer or polymer having a molecular weight suitable for the phase change characteristics described above and the characteristics of the printed matter to be produced.

[Formula 3]

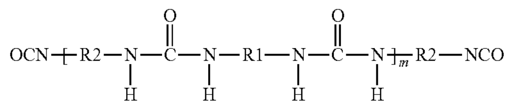

Here, R1 and R2 are hydrocarbon structures including polyol, ether, esters, or the like and m is a repeating number of 1 or more.

Example 3: Synthesis of Ink Composition Having Isocyanate Reactive Group Through Urea Reaction When m moles of monomer or prepolymer having a chemical structure of OH—R1-OH and having a hydroxy group (—OH) at both ends and (m+1) moles of monomer or prepolymer having a chemical structure of NCO—R2-NCO and having an isocyanate group (—NCO) at both ends are linked by the urea reaction between the hydroxy group (—OH) and the isocyanate group (—NCO), as shown in [Formula 4] below, it is possible to synthesize an ink composition for subject ink having an isocyanate reactive group at both ends. In this case, by adjusting the components and synthesis ratio of the monomer or prepolymer used in the synthesis, it is possible to synthesize a high-molecular oligomer or polymer having a molecular weight suitable for the phase change characteristics described above and the characteristics of the printed matter to be produced.

[Formula 4]

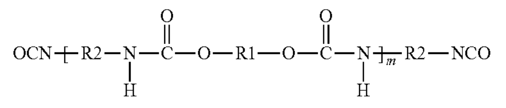

Here, R1 and R2 are hydrocarbon structures including polyol, ether, esters, or the like and m is a repeating number of 1 or more.

Preparation Example: Synthesis of Ink Composition for Subject Ink Having Amine Reactive Group 600 g of BASF's polyetheramine D2000 (Mw=2,000 g/mole) was added to a 3-necked 2 L flask equipped with a stirrer and a thermometer, and a vacuum pump was connected to the reactor to remove moisture ($H_2O$) contained in the polyetheramine introduced for 1 hour in a state in which it is maintained at 45° C. to 65° C. using a heating mantle. Thereafter, moisture remaining in the reactor was completely removed through nitrogen bubbling for another 30 minutes. In the above-described nitrogen bubbling process, a sufficient amount of nitrogen is supplied to the reactor through bubbling throughout the entire process to remove oxygen in the reactor and prevent moisture and oxygen from penetrating into the connection portion with the condenser. Thereafter, 52.4 g of BASF's HMDI (4,4' Methylenebis (cyclohexyl) isocyanate, molecular weight of 262 g/mole) was added dropwise for 30 minutes while the temperature of D2000 was lowered to 15° C. or lower using a cooling bath containing ice. The reaction proceeded with rapid heat generation, and after the heat generation was completed, the reaction was performed until the NCO peak disappeared on FT-IR while maintaining at 80° C. to 90° C. In addition, in the same manner, while changing the amount of HMDI introduced, three ink compositions for subject ink having an amine reactive group were synthesized as shown in [Table 1] below.

TABLE 1

| | D2000 | HMDI | D2000:HMDI Reaction Molar Ratio | Average Molecular Weight (Mw) |
|---|---|---|---|---|
| Preparation Example 1 | 600.0 g | 39.3 g | D2000:HMDI = 2:1 | 4,262 |
| Preparation Example 2 | 600.0 g | 52.4 g | D2000:HMDI = 3:2 | 6,524 |
| Preparation Example 3 | 600.0 g | 59.0 g | D2000:HMDI = 4:3 | 8,786 |

FIG. 3 is a graph illustrating, a change in viscosity according to a temperature of an ink composition of Preparation Examples 1 to 3 used as a subject ink in the inkjet-type 3D printing method according to the present invention.

As confirmed in the graph illustrated in FIG. 3, the ink compositions for subject ink synthesized according to the above-described method have a viscosity of about 50,000 cPs to 200,000 cPs at 50° C. to 60° C. As described above, it can be seen that the ink compositions may be applied on the build platform through a coating method such as slot die coating or curtain coating, have a viscosity rapidly increasing through the phase transition temperature section of 20° C. to 30° C., appears to be more than 4,000,000 cPs at 20° C. or lower, and undergoes a phase change to an almost completely solid state of 10,000,000 cPs or more at 10° C. or lower.

That is, by utilizing the phase change characteristics of the ink composition for subject ink, in the present invention, during the production of the 3D printed matter, through an unreacted subject ink that is applied as a liquid through the slot coating unit and gelled and frozen on the build platform, it serves as a supporter for supporting the 3D printed matter to be manufactured through the urea curing reaction with the hardener ink, thereby omitting a separate supporter structure for supporting the overhang portion of the printed matter during the 3D printing.

In addition, as the hardener ink according to the present invention, various commercially available monomers having an amine reactive group or an isocyanate reactive group may be used. In this case, as the hardener ink, it is preferable to use a monomer or oligomer having a viscosity of 500 cPs or less so that inkjet spraying may be easily performed.

In addition, as pointed out above, in the inkjet-type 3D printing process, as the overall printing speed is greatly affected by the ejection speed of the ink composition sprayed through the inkjet nozzle, the amount of hardener ink ejected may be minimized in a possible range. To this end, in the present invention, the amount of hardener ink applied on the subject ink is reduced to 1/20 to 1/5 of the volume of the subject ink applied in units of layers in the area where the hardener ink is sprayed, thereby effectively improving the printing speed of the entire 3D printing process.

That is, the relative amount of the subject ink and the hardener ink applied to the present invention is eventually determined by a mole ratio of the amine group and the isocyanate group contained in two ink compositions. According to the present invention, a high-molecule oligomer or a high-molecule polymer, which has the low-temperature phase change characteristics described above and has a molecular weight of 1,000 or more, is used as the subject ink, but a monomer or an oligomer, which has a molecular weight and viscosity much smaller than that, is used as the hardener ink, so the amount of hardener ink sprayed through the inkjet nozzle may be minimized, thereby greatly improving the entire printing speed.

In other words, in the inkjet-type 3D printing method according to the present invention, the polymer oligomer or polymer having characteristics, which exists in a liquid phase in the environment equal to or higher than a certain phase change temperature but has a viscosity rapidly increasing at a low temperature equal to or lower than the phase change temperature and undergoes a phase change to the gelled solid phase, is used as the subject ink, and is applied in units of layers on the build platform through the slot coating unit, and a relatively small amount of hardener ink is sprayed through then inkjet nozzle on the surface of the subject ink, which is applied in units of layers and solidified, according to the patterns set for each layer, and the subject ink is cured through the urea reaction between the subject ink and the hardener ink, so, through a method of driving inkjet nozzles using a 2-D actuator, it is possible to minimize the amount of hardener ink sprayed through the inkjet nozzle for the production of 3D structures while maintaining the advantages of the inkjet printing, which may more freely print various types of large-area 3D structures regardless of the size of the printed matter, and it is possible to implement relatively fast printing speed by effectively overcoming the printing speed limitation according to the ejection speed of the ink composition sprayed through the inkjet nozzle.

In addition, unlike a printing material used in conventional inkjet 3D printing processes using photocuring or thermal curing, as illustrated in the above-described embodiments, the ink composition for subject ink according to the present invention may use various types of oligomer or polymer compositions having high molecular weight as the printing material, and by printing a 3D structure using, as the subject ink, the ink composition having a phase change characteristics that is frozen and gelled at a certain phase change temperature or lower, it is possible to omit the separate supporter structure for supporting the overhang portion of the 3D structure to be printed in the 3D printing process.

Furthermore, in the present invention, by printing the 3D structure through the urea reaction between the ink composition for subject ink having the above configuration and the corresponding hardener ink, among the hardener inks that are sprayed onto the surface of the subject ink during the printing and cross-linked through the urea reaction with the subject ink and cured, by supporting the interlayer bonding force of the 3D printed matters that are formed by being continuously stacked in units of layers through the process in which a small amount of hardener ink remaining on the surface without reacting with the subject ink reacts with the lower surface of the subject ink of the subsequent layer applied sequentially and is cured, the 3D printed matter produced by the conventional SLA or SLS 3D printing process has excellent connection strength in plan view, but there is the advantage of effectively reinforcing the problem of relatively weak connection strength between the printed layers.

Test Example: Physical Properties of 3D Printed Matter (Polyurea Structure) Cured Through Urea Reaction In order to confirm the physical properties of the 3D printed matter produced as the polyurea structure through the ink composition for 3D printing based on the urea reaction and the 3D printing method using the same according to the present invention, after coating the ink compositions of Preparation Examples 1 to 3 described above on the surface of the paper treated with silicone release using a film applicator to a thickness of 100 μm, toluene diisocyanate (TDI) (molecular weight: 174, viscosity: 3 cPs) used as hardener ink was sprayed so that it is 50 μg per 1 $cm^2$ using an inkjet printer, and then the physical properties of the obtained cured film were analyzed using a universal test machine (UTM).

As shown in [Table 2], the physical properties of each cured film analyzed showed the characteristics of an excellent urea elastomer, and it was confirmed that the cured film may be applied to soles of shoes or sneakers or other various reinforced plastic or reinforced rubber products.

TABLE 2

| Physical Property | Preparation Example 1 | Preparation Example 2 | Preparation Example 3 |
|---|---|---|---|
| Secant Modulus, 2.5% | 848 MPa | 403 MPa | 238 MPa |
| Appearance Characteristics | Reinforced Plastic | Reinforced Rubber | General Rubber |

In addition, as described above, the subject ink applied to the 3D printing based on the urea reaction according to the present invention may contain an ink composition having an amine group (—$NH_2$) or an isocyanate group (—NCO) on at least one end, an inorganic filler to increase a modulus of an output, a colorant to implement color, and other various functional additives.

Inorganic Filler

The subject ink may contain an inorganic filler to increase a modulus of an output. In this case, the appropriate content of the filler is about 5% wt to 40.0% wt. Examples of the inorganic filler may include talc, silicon dioxide ($SiO_2$), titanium dioxide ($TiO_2$), calcium carbonate, aluminum hydroxide, magnesium hydroxide, glass fiber, carbon fiber, etc., but are not limited thereto.

Colorant

The subject ink may also contain colorants such as dyes or pigments. In this case, the appropriate colorant content is about 0.001% wt to 10.0% wt. For example, various commercially available red, blue, and yellow pigments having physical properties, which can be dissolved in the ink composition, may be used, and in addition, white pigments based on titanium dioxide or zinc oxide may also be applied.

Additives

The subject ink according to the present invention may also further include additives for obtaining various functional advantages. For example, the subject ink may include one or more combinations of various additives such as antifoaming agents, slip and leveling agents, pigment dispersants, antioxidants, flame retardants, or leveling agents.

In addition, as already described above, the hardener ink applied to the present invention may use various commercially available monomers having an amine reactive group or an isocyanate reactive group.

Examples of monomers having an amine reactive group may include dipropylene triamine, diethylene triamine, N,N-bis-(3-aminopropyl) ethylenediamine, methyl-diaminocyclohexane, isophorone diamine, 4,4-methylenebis(cyclohexylamine), 3,3-dimethyl-4,4-diaminocycloheylmethane, 4,7,10, trioxatridecane-1,13-diamine, 4,9-dioxadodecane-1, 12-diamine, polyetheramine, and the like.

Examples of the monomer having an isocyanate reactive group may include hexamethylene diisocyanate (HMDI), diphenyl methane diisocyanate (MDI), toluene diisocyanate (TDI), p-phenylene diisocyanate (PDI), isophorone diisocyanate (IPDI), and the like, and hexamethylene diisocyanate trimer or tri(4-isocyanatopheny)methane, and the like may be used in combination therewith.

In this case, it goes without saying that various functional additives such as an antioxidant, a leveling agent, and a surface modifier may be contained in the above-described hardener ink.

The embodiments of the present invention described above only show some examples of preferred embodiments of the present invention, and the present invention is not limited thereto, and the scope of protection of the present invention is limited by the matters described in the claims below. In addition, it is natural for those skilled in the art to implement various modifications without changing the subject matter of the present invention claimed in the claims, and therefore, such modifications or improvements will fall within the scope of the present invention as long as they are within the scope of matters obvious to those skilled in the art to which the present invention belongs.

| <Detailed Description of Main Elements> | |
|---|---|
| 100: Reaction chamber | 200: Build platform |
| 300: Slot coating unit | 400: Inkjet printer |

-continued

| <Detailed Description of Main Elements> | |
|---|---|
| 500: Subject ink | 600: Hardener ink |
| 700: 3D printed matter | |

INDUSTRIAL APPLICABILITY

As described above, according to the present invention, by providing an ink composition for subject ink made of a high molecular oligomer or a high molecular polymer that exists as a liquid in an environment above a certain phase change temperature but has characteristics in which a phase change is made to a gelled solid phase with a rapid increase in viscosity at a low temperature equal to or lower than the phase change temperature while presenting a 3D printing method that combines a subject ink and a hardener ink each having an amine group (—NH2) and an isocyanate group (—NCO) to form a 3D structure through cross-linking by a urea reaction between the subject ink and hardener ink, it is possible to omit a separate supporter structure for supporting an overhang portion of a 3D structure to be printed in the 3D printing process, by only a simple process of weakly heating the printed matter and the ink composition block stacked together with the printed matter again above the phase change temperature after the production of the printed matter is completed, it is possible to recover an unreacted gelled solid subject ink by phase-changing the unreacted gelled solid subject ink other than the 3D printed matter cured by the urea reaction back to a liquid phase, and by purifying the recovered subject ink again through a simple filtration process and reusing the recovered subject ink as the subject ink for 3D printing, it is possible to implement a more economical 3D printing process In addition, as exemplarily described above, according to the present invention, by using various types of oligomer or polymer compositions having a high molecular weight of 1,000 Mw (g/mole) or more as a main component of the ink composition for subject ink and by using a monomer or oligomer having a low viscosity of 500 cPs or less and a relatively small molecular weight, which is easy to spray ink, as a hardener ink, for the production of the 3D structure, it is possible to minimize the amount of hardener ink sprayed through the inkjet nozzle, effectively overcome a printing speed limitation according to an ejection speed of the ink composition sprayed through the inkjet nozzle, and quickly print various types of large-area 3D structures regardless of the size of the printed matter through the method of driving an inkjet nozzle using a 2-D actuator.

The invention claimed is:

1. An ink composition for subject ink applied to a 3D printing method in which a 3D structure is printed by cross-linking through a urea reaction between a subject ink and a hardener ink, wherein the ink composition for subject ink has a [Formula 2] structure below:

[Formula 2]

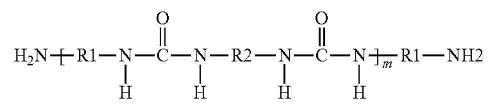

wherein R1 and R2 are a hydrocarbon structure, and m is a repeating number of 1 or more.

2. The ink composition of claim 1, wherein the ink compositions are synthesized by linking (m+1) moles of monomer or prepolymer having a chemical structure of $NH_2$—R1-$NH_2$ and having an amine group (—$NH_2$) at both ends and m moles of a monomer or prepolymer having a chemical structure of NCO—R2-NCO and having an isocyanate group (—NCO) at both ends through the urea reaction.

3. An ink composition for subject ink applied to a 3D printing method in which a 3D structure is printed by cross-linking through a urea reaction between a subject ink and a hardener ink, the ink composition comprising:

i) the ink composition according to claim 1;

ii) an inorganic filler;

iii) a colorant; and iv) an additive.

4. The ink composition of claim 3, wherein the inorganic filler is made of any one or a combination of two or more of talc, silicon dioxide ($SiO_2$), titanium dioxide ($TiO_2$), calcium carbonate, aluminum hydroxide, magnesium hydroxide, glass fiber, and carbon fiber.

5. The ink composition of claim 3, wherein the inorganic filler is included in a range of 5% wt to 40.0% wt of a total weight of the ink composition.

6. The ink composition of claim 3, wherein the colorant is included in a range of 5% wt to 40.0% wt of a total weight of the ink composition.

7. The ink composition of claim 3, wherein the additive is made of combination of any one or more of an antifoaming agent, a slip and leveling agent, a pigment dispersant, an antioxidant, a flame retardant, or a leveling agent.

8. An ink composition according to claim 1, wherein the ink composition has a liquid-phase viscosity capable of coating in units of layers in an environment equal to or higher than a certain phase change temperature, and undergoes a phase change to a gelled solid phase in a low-temperature environment equal to or lower than the phase transition temperature.

9. An ink composition according to claim 1, wherein the ink composition has a molecular weight of 1,000 Mw (g/mole) or more.

10. An inkjet-type 3D printing method based on a urea reaction printing a 3D structure through cross-linking by the urea reaction between a subject ink and a hardener ink by linking the subject ink and the hardener ink each having an amine group (—$NH_2$) and an isocyanate group (—NCO), the inkjet-type 3D printing method comprising:

applying a subject ink made of a high molecular oligomer or a high polymer containing an amine group (—$NH_2$) or an isocyanate group (—NCO) on at least one end on a build platform in units of layers to a certain thickness by a slot coating method;

spraying a hardener ink made of a monomer or an oligomer containing the isocyanate group (—NCO) or the amine group (—$NH_2$) on at least one end according to patterns set in advance for each layer according to a shape of a 3D structure to be manufactured onto a surface of the subject ink applied in the units of layers through an inkjet nozzle and curing a 3D structure layer through cross-linking by the urea reaction between amine and isocyanate contained in the subject ink and the hardener ink, respectively; and applying the subject ink on the layer cured by the urea reaction in the units of layers again, repeatedly curing the 3D structure layer by spraying the hardener ink through the inkjet nozzle, and printing the 3D printed matter in which the layers cured through the cross-linking by the urea reaction are stacked;

wherein the subject ink includes the ink composition according to claim 1.

11. The inkjet-type 3D printing method of claim 10, wherein the subject ink is made of an ink composition having phase change characteristics which has a liquid-phase viscosity coating in units of layers in an environment equal to or higher than a certain phase change temperature and undergoes the phase change to the gelled solid phase in a low-temperature environment equal to or lower than the phase transition temperature, the printing of the 3D structure is configured to be performed in a reaction chamber in which a low-temperature environment equal to or lower than the phase change temperature is maintained, and the 3D printed matter stacked and printed through the urea reaction is configured to be supported through an unreacted subject ink applied in units of layers and frozen in a gelled solid on the build platform.

12. The inkjet-type 3D printing method of claim 10, wherein the hardener ink is made of a monomer or an oligomer having a viscosity of 500 cPs or less.

13. The inkjet-type 3D printing method of claim 10, wherein a volume of the hardener ink sprayed onto the surface of the subject ink applied in the units of layers through the inkjet nozzle is 1/20 to 1/5 of a volume of the subject ink applied to the spray area.

14. The inkjet-type 3D printing method of claim 12, wherein, as the hardener ink, a commercially available monomer having an amine group (—$NH_2$) or an isocyanate group (—NCO) is used.

15. The inkjet-type 3D printing method of claim 10, wherein the subject ink includes an inorganic filler, a colorant, and at least one functional additive.

16. The inkjet-type 3D printing method of claim 14, wherein the hardener ink contains at least one functional additive containing an antioxidant, a leveling agent, or a surface modifier.

17. An ink composition for subject ink applied to a 3D printing method in which a 3D structure is printed by cross-linking through a urea reaction between a subject ink and a hardener ink, wherein the ink composition for subject ink has a [Formula 3] structure below:

[Formula 3]

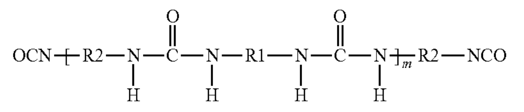

wherein R1 and R2 are a hydrocarbon structure, and m is a repeating number of 1 or more.

18. The ink composition of claim 17, wherein the ink compositions are synthesized by linking m moles of monomer or prepolymer having a chemical structure of $NH_2$—R1-$NH_2$ and having an amine group (—$NH_2$) at both ends and (m+1) moles of monomer or prepolymer composed of a chemical structure of NCO—R2-NCO and having an isocyanate group (—NCO) at both ends through the urea reaction.

19. An inkjet-type 3D printing method based on a urea reaction printing a 3D structure through cross-linking by the urea reaction between a subject ink and a hardener ink by linking the subject ink and the hardener ink each having an amine group (—$NH_2$) and an isocyanate group (—NCO), the inkjet-type 3D printing method comprising:

applying a subject ink made of a high molecular oligomer or a high polymer containing an amine group (—$NH_2$) or an isocyanate group (—NCO) on at least one end on a build platform in units of layers to a certain thickness by a slot coating method;

spraying a hardener ink made of a monomer or an oligomer containing the isocyanate group (—NCO) or the amine group (—$NH_2$) on at least one end according to patterns set in advance for each layer according to a shape of a 3D structure to be manufactured onto a surface of the subject ink applied in the units of layers through an inkjet nozzle and curing a 3D structure layer through cross-linking by the urea reaction between amine and isocyanate contained in the subject ink and the hardener ink, respectively; and applying the subject ink on the layer cured by the urea reaction in the units of layers again, repeatedly curing the 3D structure layer by spraying the hardener ink through the inkjet nozzle, and printing the 3D printed matter in which the layers cured through the cross-linking by the urea reaction are stacked;

wherein the subject ink includes the ink composition according to claim 17.

* * * * *